No. 722,479. PATENTED MAR. 10, 1903.
H. A. BERGER.
BUTTON TURNING MACHINE.
APPLICATION FILED MAY 21, 1902.
NO MODEL. 9 SHEETS—SHEET 3.

WITNESSES:
Edward Thorpe

INVENTOR
Henry A. Berger
BY
ATTORNEYS.

No. 722,479. PATENTED MAR. 10, 1903.
H. A. BERGER.
BUTTON TURNING MACHINE.
APPLICATION FILED MAY 21, 1902.
NO MODEL. 9 SHEETS—SHEET 4.

WITNESSES:
Edward Thorpe.

INVENTOR
Henry A. Berger
BY
ATTORNEYS.

No. 722,479. PATENTED MAR. 10, 1903.
H. A. BERGER.
BUTTON TURNING MACHINE.
APPLICATION FILED MAY 21, 1902.
NO MODEL. 9 SHEETS—SHEET 5.

WITNESSES:
Edward Thorpe

INVENTOR
Henry A. Berger
BY
ATTORNEYS.

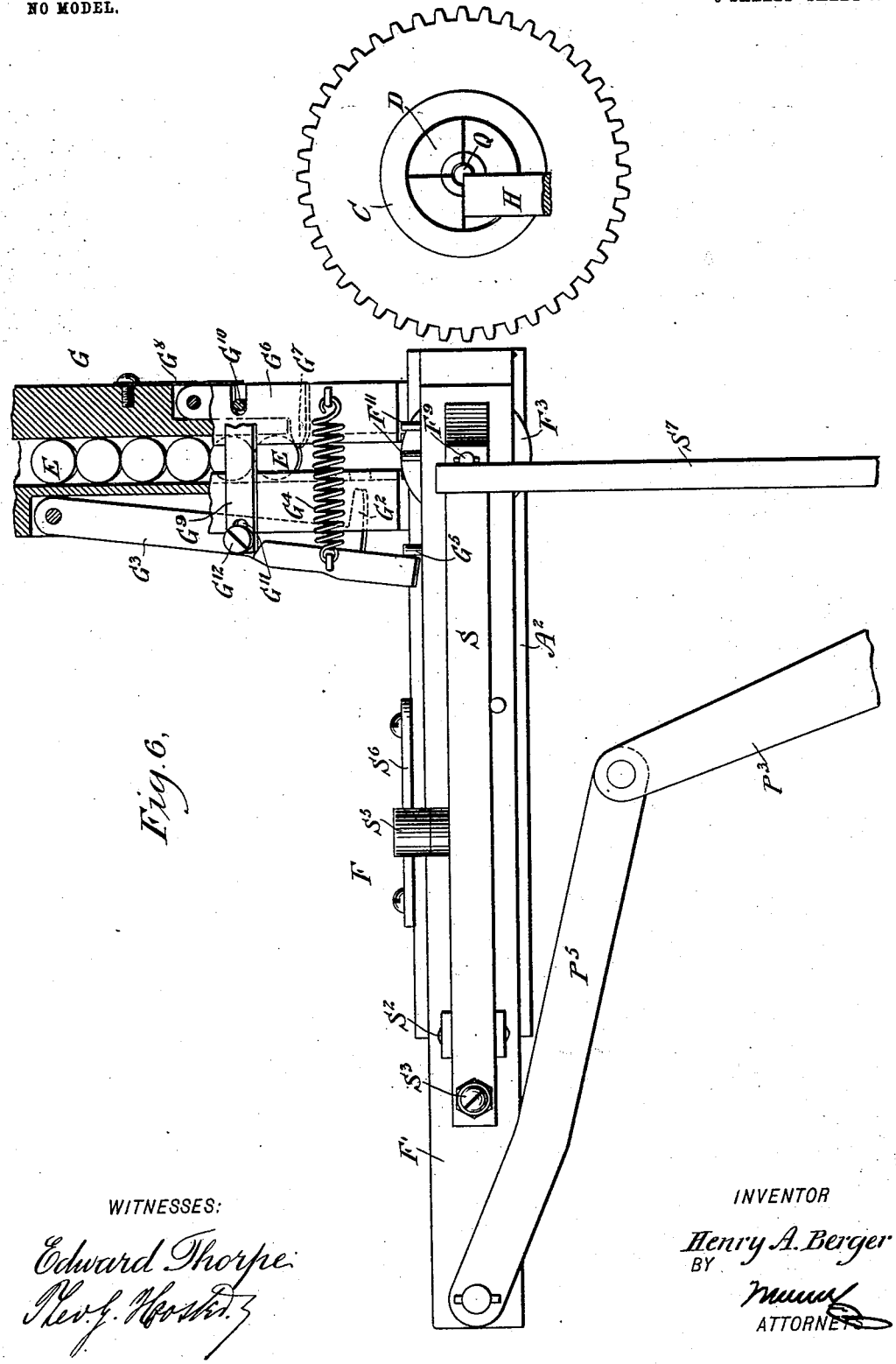

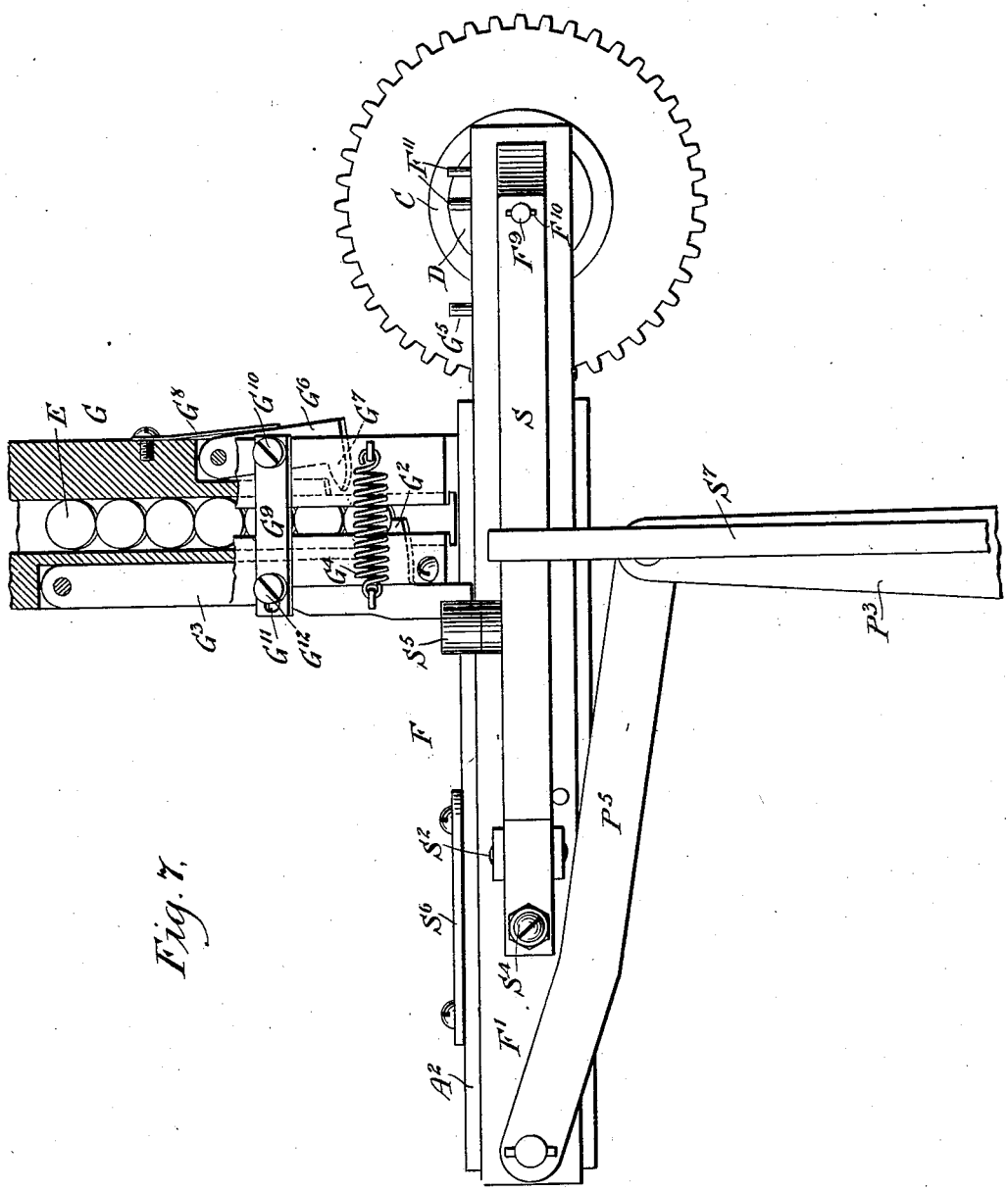

No. 722,479. PATENTED MAR. 10, 1903.
H. A. BERGER.
BUTTON TURNING MACHINE.
APPLICATION FILED MAY 21, 1902.
NO MODEL. 9 SHEETS—SHEET 8.
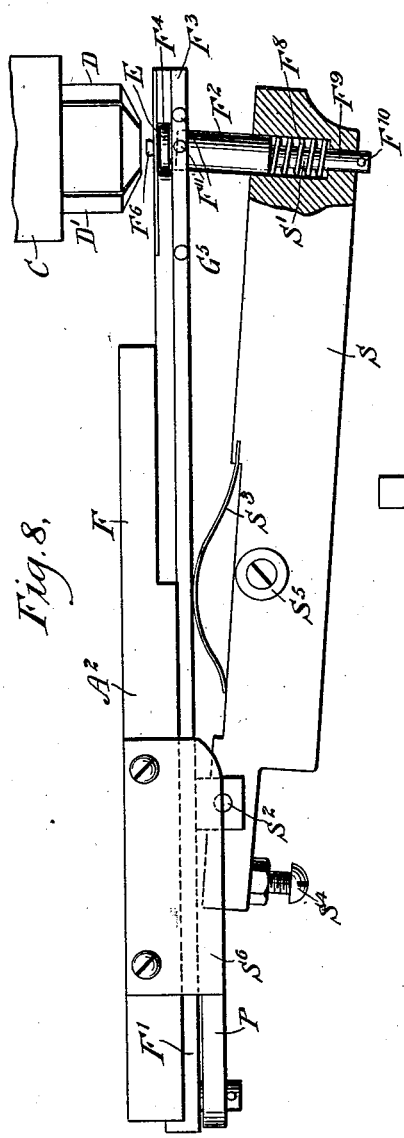
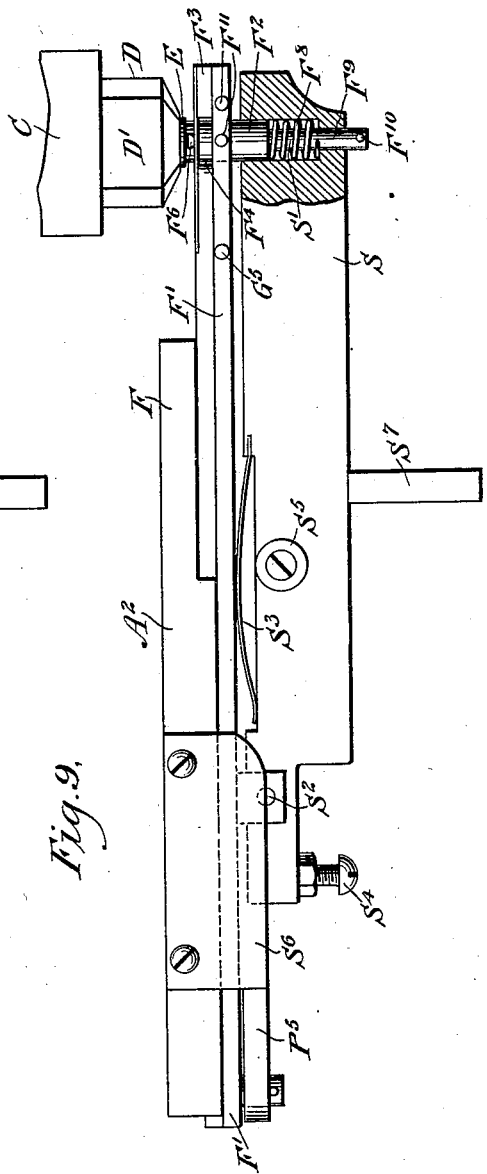
WITNESSES:
Edward Thorpe.
INVENTOR
Henry A. Berger
BY
ATTORNEYS.

No. 722,479. PATENTED MAR. 10, 1903.
H. A. BERGER.
BUTTON TURNING MACHINE
APPLICATION FILED MAY 21, 1902.
NO MODEL. 9 SHEETS—SHEET 9.
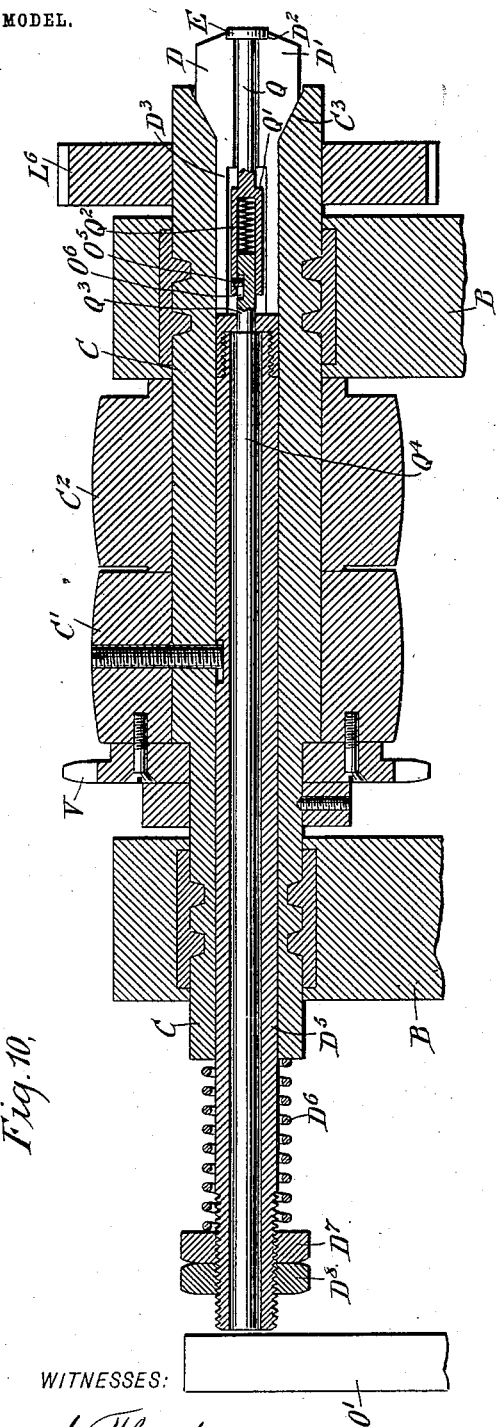
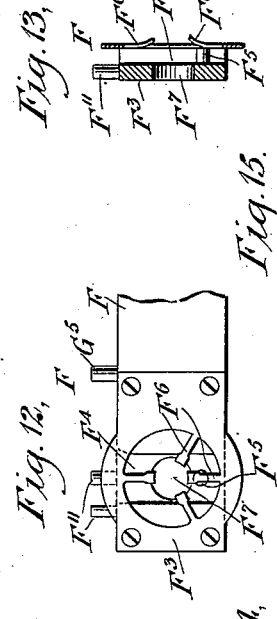
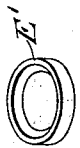
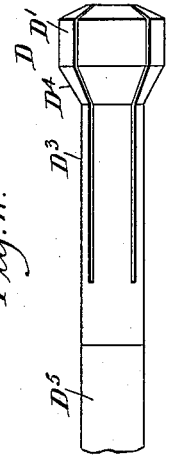
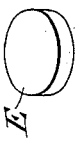
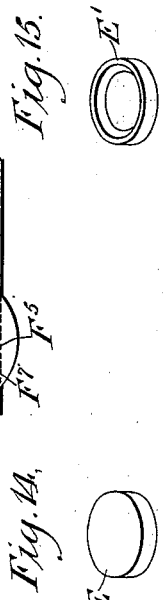
WITNESSES:
Edward Thorpe
Theo. G. Hoster
INVENTOR
Henry A. Berger
BY
ATTORNEYS

UNITED STATES PATENT OFFICE.

HENRY A. BERGER, OF BROOKLYN, NEW YORK.

BUTTON-TURNING MACHINE.

SPECIFICATION forming part of Letters Patent No. 722,479, dated March 10, 1903.

Application filed May 21, 1902. Serial No. 108,352. (No model.)

*To all whom it may concern:*

Be it known that I, HENRY A. BERGER, a citizen of the United States, and a resident of the city of New York, borough of Brooklyn, in the county of Kings and State of New York, have invented a new and Improved Button-Turning Machine, of which the following is a full, clear, and exact description.

The object of the invention is to provide a new and improved turning-machine more especially designed for turning mother-of-pearl buttons and the like and arranged to operate automatically in such a manner that the button-blanks are singly passed from a chute to a chuck, then the turning-tool is advanced to turn the face of the button-blank while the chuck revolves, and then the tool is caused to recede and is sharpened, and finally the turned button is ejected from the chuck and replaced by a button-blank.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
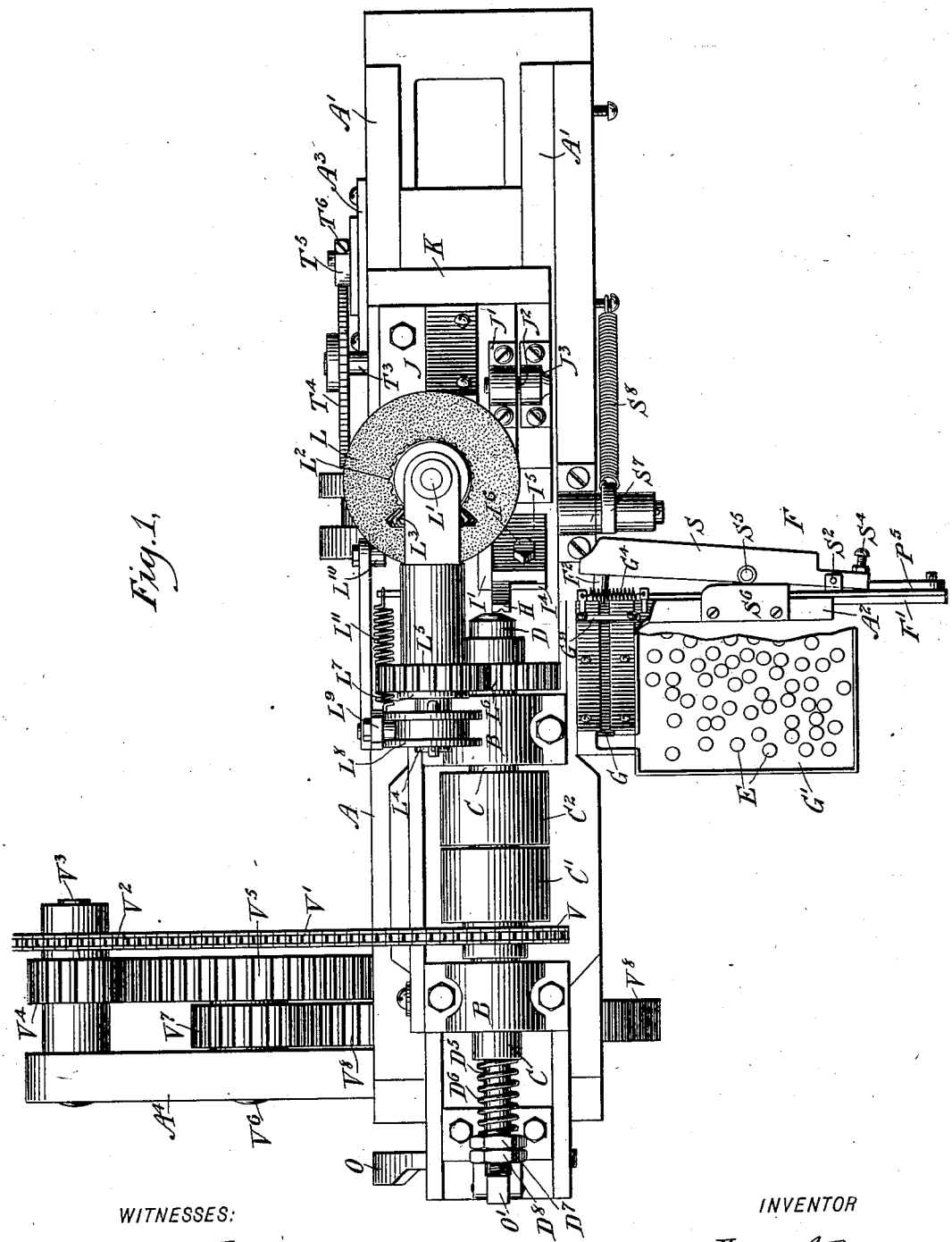
Figure 2:
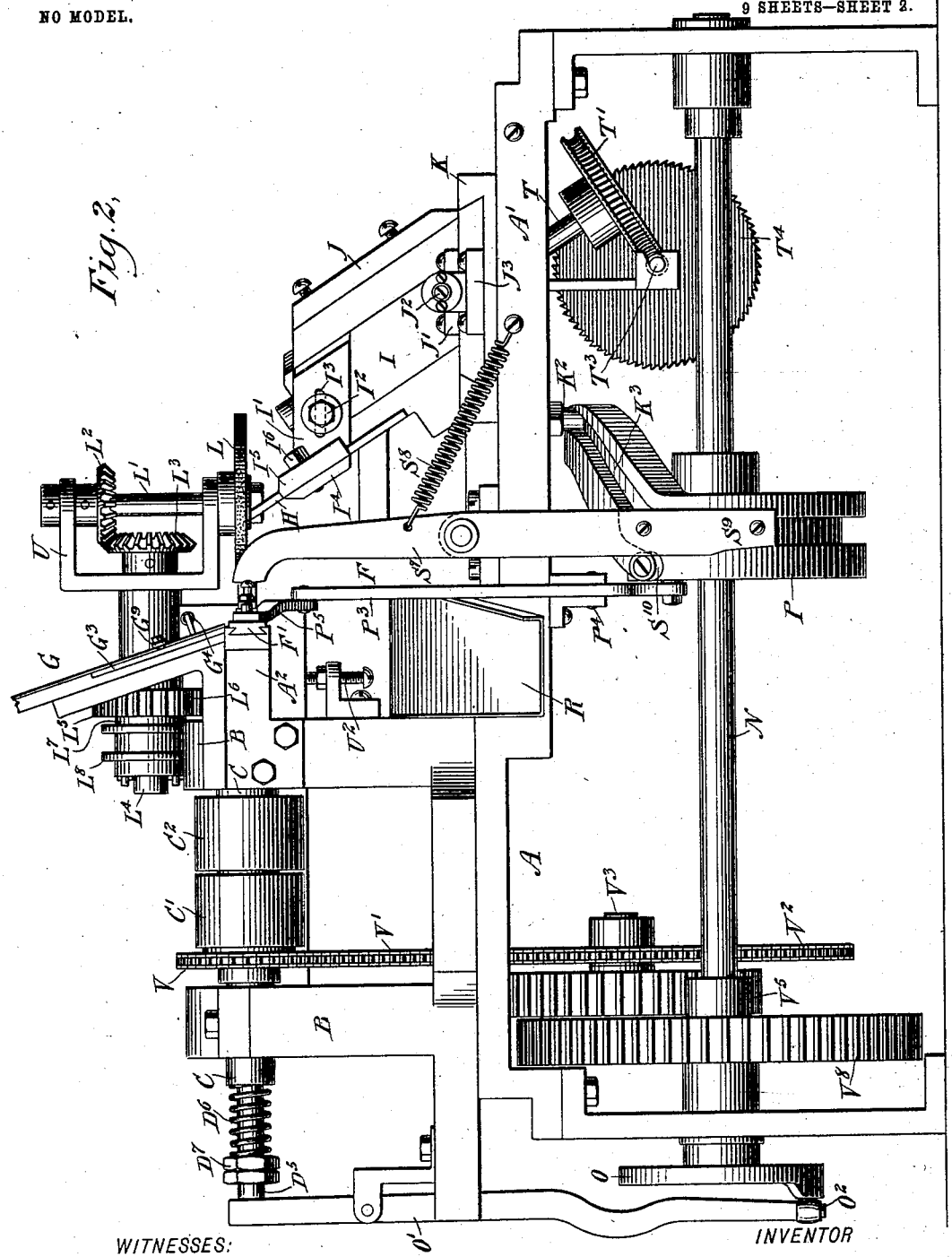
Figure 3:
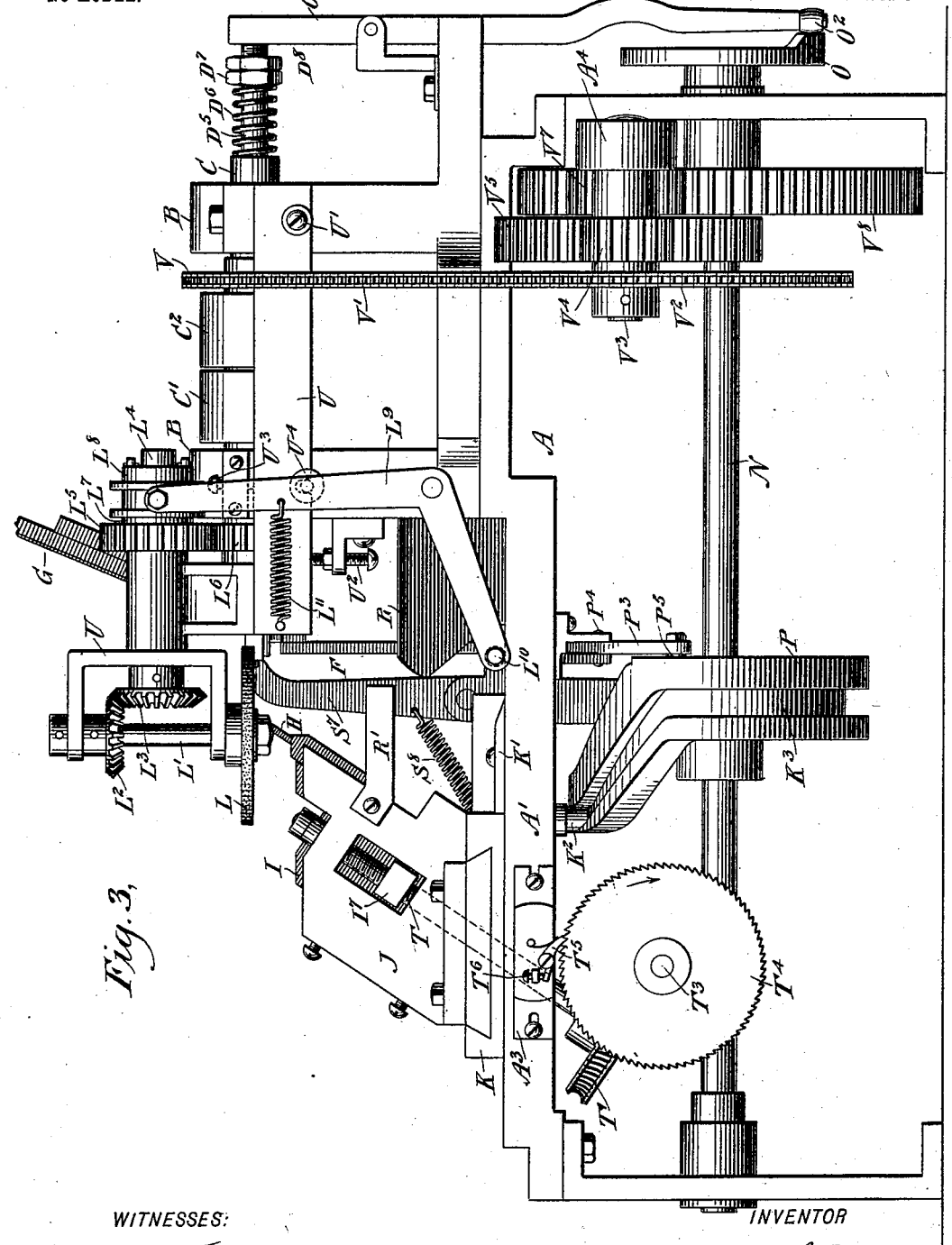
Figure 4:
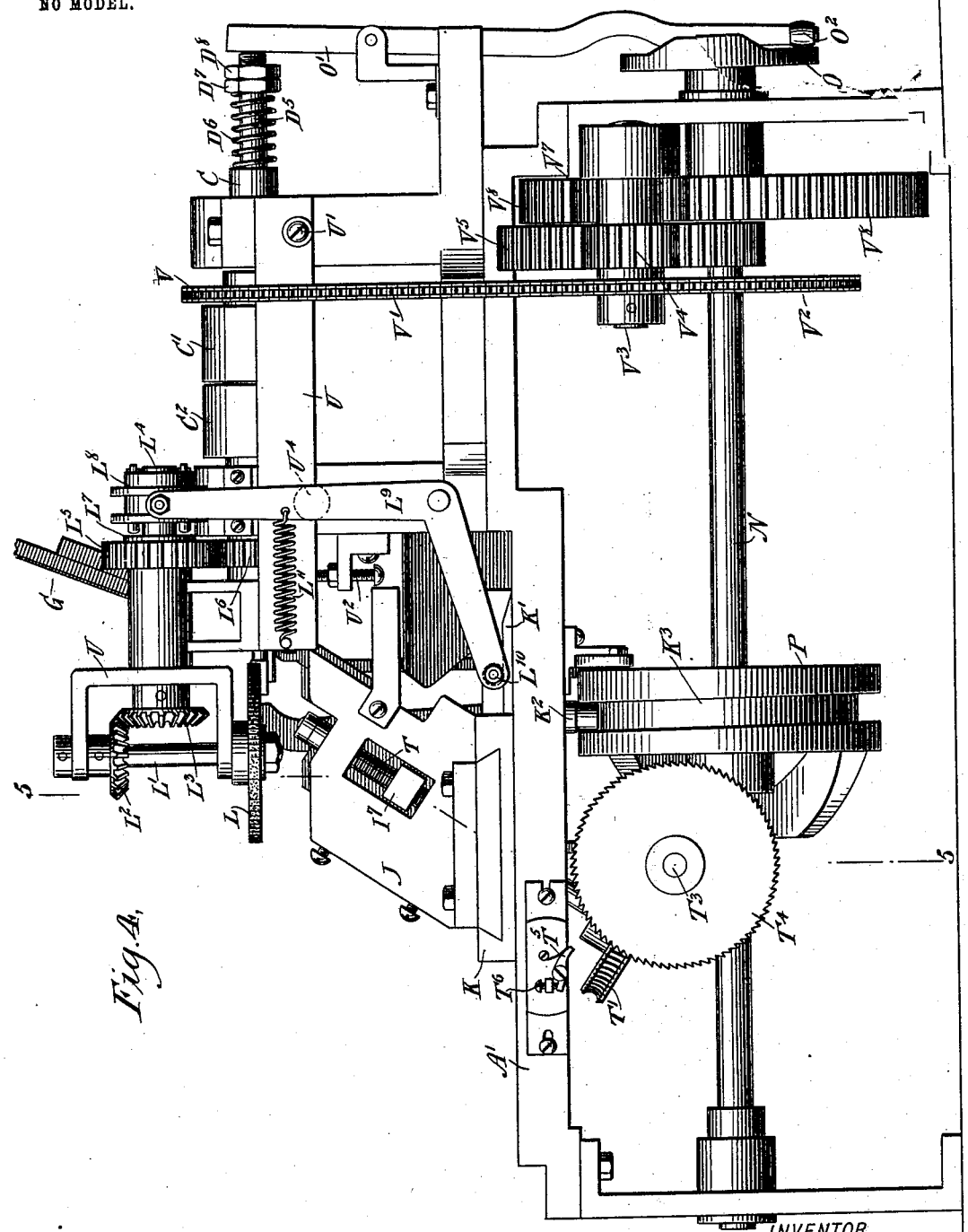
Figure 5:
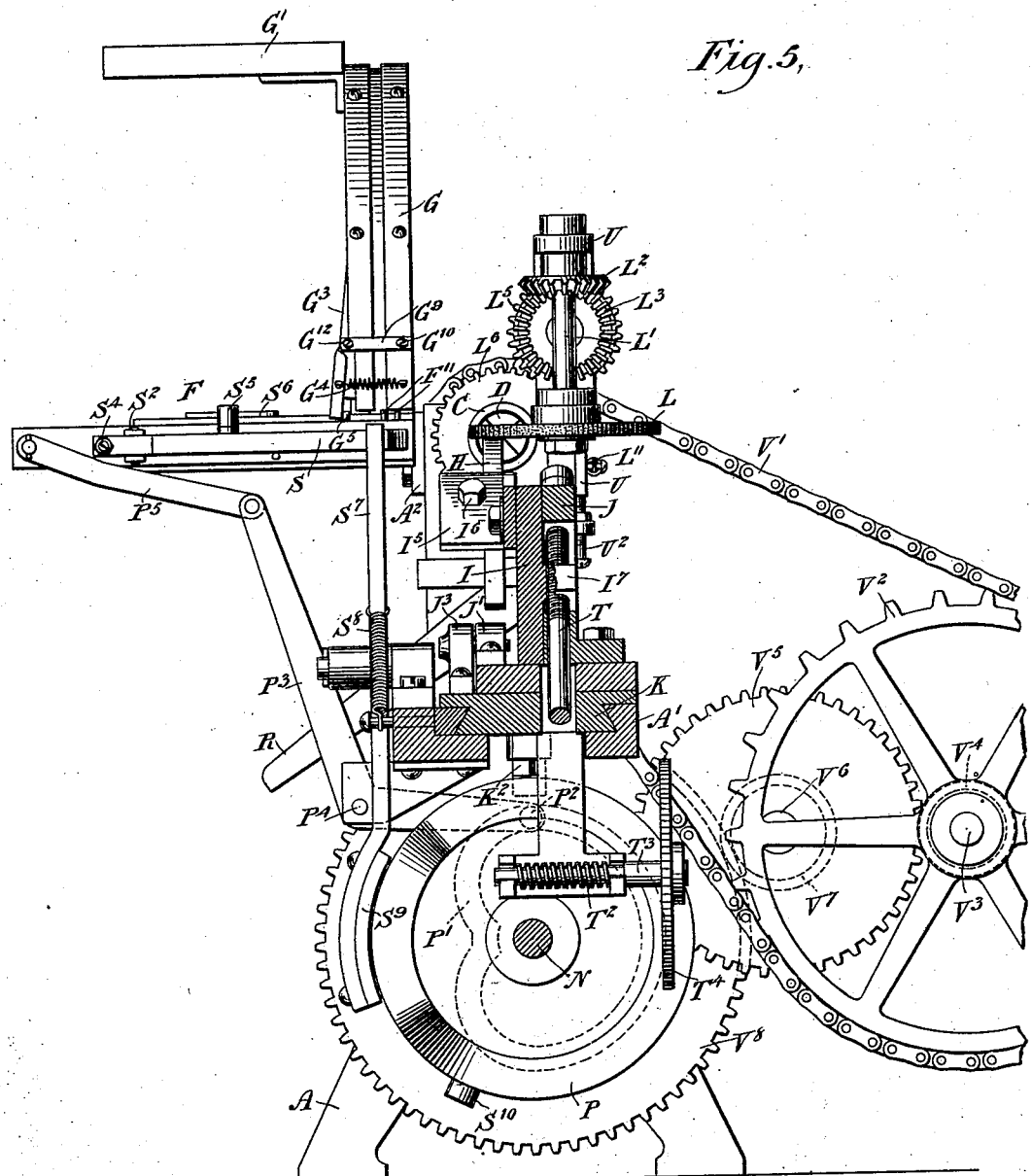

Figure 1 is a plan view of the improvement, showing the tool in position for turning the face of a button-blank. Fig. 2 is a side elevation of the same, showing the tool in a receded position in engagement with the grinding-wheel. Fig. 3 is a rear side elevation of the same. Fig. 4 is a like view of the same, with parts in the position shown in Fig. 1. Fig. 5 is a transverse section of the same on the line 5 5 of Fig. 4. Fig. 6 is an enlarged face view of the chuck, the tool, and the transferring device for transferring a button-blank from the chute to the chuck, part of the chute being shown in section. Fig. 7 is a similar view of the same with the turning-tool omitted and the transferring device in position for passing the button-blank to the chuck, part of the chute being in section. Fig. 8 is a plan view of the same, with parts in section. Fig. 9 is a like view of the same, showing the parts in a final-delivery position. Fig. 10 is an enlarged longitudinal section of the head-stock, the spindle, and the chuck holding the button-blank. Fig. 11 is a side elevation of the chuck. Fig. 12 is a face view of the button-blank slide of the transferring device. Fig. 13 is a cross-section of the same. Fig. 14 is a perspective view of a button-blank, and Fig. 15 is a similar view of a turned button.

The improved button-turning machine is mounted on a suitably-constructed frame A, provided with a head-stock B, in which is mounted to rotate a hollow spindle C, containing a chuck D, adapted to receive a button-blank E, and on the said spindle are arranged fast and loose pulleys $C'$ $C^2$, connected by belt with other machinery for imparting a rotary motion to the said spindle C and its chuck D. The button-blank E is carried to the chuck D by a transferring device F from a chute G, (see Figs. 1, 6, 7, 8, and 9,) and the button-blank is turned on its face while held in the chuck by a turning-tool H, attached to a tool-post I, mounted to slide up and down in an inclined direction on a carrier J, held transversely adjustable on a carriage K, mounted to reciprocate in a longitudinal direction on guideways $A'$, held on the frame A. When the carriage recedes, the tool-post I and tool H are bodily moved in an upward and forward direction on the carrier J to bring the face of the cutting-tool H in engagement with the under side of a horizontally-disposed grinding-wheel L, driven from the spindle C, so that the cutting-tool is sharpened for every new button to be turned immediately previous to the forward or advance movement of the carriage.

On the main frame is journaled a longitudinally-extending cam-shaft N, driven from the spindle C and carrying a cam O, forming part of the actuating mechanism for opening the chuck D, and on the said shaft N is also secured a multiple cam P for actuating the transferring device F and the carriage K, as hereinafter more fully described in detail.

The chuck D (see Figs. 10 and 11) has its head $D'$ formed at the front end with a central recess or seat $D^2$ for the button-blank E, and the said head and part of its shank $D^3$ are split longitudinally to form jaws for securely holding the button-blank E in position in the seat $D'$, so that the button-blank rotates with the chuck for the tool H to turn it on its face. The rear portion of the chuck-head D' is formed with an annular bevel $D^4$, adapted to engage a correspondingly-formed bevel $C^3$ in the spindle C to close the chuck-jaws on moving the chuck inwardly in the spindle C. The shank $D^3$ is secured to an extension $D^5$, extending through the spindle C, beyond the outer end thereof, as plainly shown in the drawings, and on the outer portion of the extension $D^5$ is coiled a spring $D^6$, resting with one end on the outer end of the spindle C and resting with its other end on a nut $D^7$, screwing on the outer threaded portion of the extension $D^5$. By adjusting the nut $D^7$ the tension of the spring $D^6$ may be regulated, it being understood that the said spring $D^6$ serves to hold the chuck D in an innermost position for the chuck to rotate with the spindle and for the chuck to hold the button-blank E securely in position in the seat $D^2$. A jam-nut $D^8$ serves to lock the nut $D^7$ in position after the spring $D^6$ is regulated.

The outer end of the chuck extension $D^5$ is adapted to be pressed by the upper end of a lever O', engaged by the cam O, previously mentioned, so that when the machine is in operation the said cam imparts periodically a swinging motion to the said lever O' for the latter to press the chuck D against the tension of the spring $D^6$ to allow the jaws of the chuck D to open by their own resiliency to release the button-blank E immediately after the same has been turned by the tool H, as hereinafter more fully described.

In order to eject the turned button from the seat $D^2$ as soon as the jaws of the chuck D open, I employ an ejector-rod Q, mounted to slide centrally in the chuck D, as plainly indicated in Fig. 10. The rear end of this ejector-rod Q is formed with a socket Q', containing a light spring $Q^2$, resting on the reduced end $Q^3$ of a rod $Q^4$, held in the extension $D^5$ of the chuck. On the socket Q' is secured a set screw or pin $Q^5$, extending into a longitudinally-extending slot $Q^6$, formed in the reduced end $Q^3$, so as to limit the sliding movement of the socket Q' on the reduced end $Q^3$ of the rod $Q^4$. Now it will be seen that when the button-blank E is pushed in position on the seat $D^2$, as hereinafter more fully described, then the ejector-rod Q is pushed inwardly against the tension of its spring $Q^2$, and as the chuck-jaws now close the button is held in position by the jaws; but as soon as the chuck moves outwardly and the jaws open by their resiliency then the spring $Q^2$ pushes the ejector-rod forward, so as to move the turned button E out of the seat $D^2$, the turned button dropping downward into a chute R, carried by the main frame A and serving to deliver the turned button to one side of the machine. (See Figs. 2 and 5.)

The transferring device F (shown in detail in Figs. 6, 7, 8, 9, 12, and 13) consists, essentially, of a slide F' and a pusher $F^2$ for pushing the button-blank E out of the slide into the seat $D^2$ of the chuck D. The slide F' is mounted to slide transversely in guideways formed in a bracket $A^2$, secured to the front side of the frame A, and the said slide is formed at its inner end with a head $F^3$, (see Figs. 12 and 13,) having a vertically-disposed recess $F^4$, into the lower portion of which extends a pin $F^5$ for the button-blank E to rest on. The recess $F^4$ is of approximately the width of the button-blank E, held against falling out of the recess by radially-disposed spring-arms $F^6$, forming part of the head $F^3$ and extending with their inner ends to the face of the blank E, adjacent to the edge thereof. In the back wall of the head $F^3$ is formed an aperture $F^7$, leading to the recess $F^4$ and in register with the button-blank seated at the time in the recess $F^4$; but the said aperture $F^7$ is somewhat less in diameter than the diameter of the blank to prevent the latter from falling out of the aperture $F^7$. In this aperture $F^7$ is mounted to slide the pusher $F^2$ to force the button-blank out of the recess $F^4$ past the free ends of the spring-arms $F^6$, which latter, owing to their resiliency, yield outwardly for the purpose. This operation takes place at the time the head $F^3$ is in longitudinal or central alinement with the chuck D. (See Figs. 8 and 9.) It is understood that normally the pusher $F^2$ is out of the recess $F^4$, as indicated in Fig. 8, to allow the button-blank E to drop into the recess from the chute G, as hereinafter more fully described. An intermittent reciprocating motion is given to the slide F' from the multiple cam P, provided for the purpose on its face with an approximately heart-shaped cam P', in which travels a friction-roller $P^2$, (see Fig. 5,) held on one end of a bell-crank lever $P^3$, fulcrumed at $P^4$ on the main frame A and having its other end connected by a link $P^5$ with the outer end of the slide F'. Now when the machine is in operation and the cam-shaft N rotates then the cam P imparts an intermittent swinging motion to the bell-crank lever $P^3$, and the latter by the link $P^5$ forces the slide to slide transversely to bring the head $F^3$ alternately in register with the delivery end of the chute G and the seat $D^2$ of the chuck D.

The pusher $F^2$ is mounted to slide in a recess S', formed on an arm S, fulcrumed at $S^2$ on the slide F' and pressed on by a spring $S^3$ to hold the arm S normally in the outermost position, (shown in Fig. 8,) so that the outer end of the pusher $F^2$ clears the recess $F^4$. A set-screw $S^4$ in the heel end of the arm S serves to limit the outward swinging motion of the arm S. In order to impart, however, a positive outward swinging motion to the arm S shortly after the button-blank has been delivered to the chuck D and the slide F' is on the return stroke, I provide the said arm S on top with a friction-roller $S^5$, adapted to engage a cam-face $S^6$, secured to the bracket $A^2$, in which the slide F' is mounted. Thus when the slide F' is on the return stroke and the pusher $F^2$ and its arm S are in a closed position, as shown in Fig. 9, then the friction-roller $S^5$ in coming in contact with and traveling along the cam-surface $S^6$ imparts an outward swinging motion to the arm S to move the latter into the position shown in Fig. 8 for the pusher $F^2$ to clear the recess $F^4$. The pusher $F^2$ is yieldingly mounted on the arm S and is pressed on for the purpose by a spring $F^8$, extending in the recess $S'$ and coiled around the reduced portion $F^9$ of the said pusher. The reduced portion $F^9$ extends to the outside of the arm S and carries at the outer end a stop-pin $F^{10}$ to limit the outward movement of the pusher $F^2$ in the recess $S'$, caused by the spring $F^8$, as will be readily understood by reference to Fig. 8. The arm S is swung into a closed position by the upper end of a lever $S^7$, fulcrumed on the main frame and normally held in an inactive position by a spring $S^8$. (See Figs. 1 and 5.) The lever end of the lever $S^7$ is provided with a cam-shoe $S^9$, adapted to be engaged by a friction roller or pin $S^{10}$, held on the peripheral surface of the multiple cam P, so that during every revolution of the cam P the friction-roller $S^{10}$ imparts a swinging motion to the lever $S^7$ against the tension of its spring $S^8$ to cause the upper end of the lever to swing the arm S toward the slide $F'$ at the time the head $F^3$ thereof is in register with the chuck D. (See Fig. 9.) Now it is evident that when the arm S swings inward the pusher $F^2$ pushes the button-blank E out of the recess $F^4$ and past the spring-arms $F^6$ into the seat $D^2$ against the receding ejector-rod Q, and the said pusher $F^2$ remains in contact with the button-blank in position in the seat. When this has been done, the friction-roller $S^{10}$ travels on the lower portion of the cam-shoe $S^9$ to allow an initial return swinging movement of the lever $S^7$ sufficient for the spring $S^8$ to swing the arm S outward until the pusher $F^2$ is away from the outer end of the pusher $F^2$ is away from the button-blank and the chuck, it being understood that this initial outward movement of the lever $S^7$ is caused by the spring $S^8$. The slide $F'$, with the arm S, now moves on the outward stroke, with the lever $S^7$, however, still holding the arm S in partly-closed position until the pusher nears the bracket $A^2$, when the friction-roller $S^{10}$ slides off the cam-shoe $S^9$, and the lever $S^7$ now returns to its normal dormant position by the action of the spring $S^8$, thus completely releasing the arm S, which is now returned to its final outermost position by the spring $S^3$ and the friction-roller $S^5$, traveling on the cam-surface $S^6$.

The inclined chute G is secured to the bracket $A^2$, and its lower or delivery end registers with the top of the recess $F^4$ at the time the slide $F'$ is in an outermost position. (See Figs. 5 and 6.) The upper end of the chute G terminates in a platform $G'$, containing the button-blanks E to be fed by hand or otherwise into the chute G, so that one button-blank rests on top of the other, as indicated in Figs. 6 and 7. The lowermost button-blank E in the chute G (see Fig. 7) rests on a lug $G^2$, formed on the free end of an arm $G^3$, fulcrumed at its upper end on one side of the chute G, the said arm $G^3$ being pressed on by a spring $G^4$ to normally hold the arm $G^3$ in an innermost position, so that its lug $G^2$ is in the path of the lowermost button-blank and retains the same in the chute, and with it the following button-blanks. A pin $G^5$, projecting from the top of the slide $F'$, is adapted to engage the lower or free end of the arm $G^3$ to swing the arm $G^3$ into an outermost position at the time the slide $F'$ moves into an outermost position. (See Fig. 6.) When the arm $G^3$ swings outwardly, then the lug $G^2$ passes from under the lowermost button-blank to allow this blank to drop past the lug $G^2$ down into the recess $F^4$ now in register with the delivery end of the chute G. In order to prevent the next lower button-blank E from sliding past the lug $G^2$ at the time the latter is in an outermost position, I provide a second arm $G^6$, similar to the arm $G^3$ and fulcrumed on the opposite side of the chute G. This arm $G^6$ is provided with a lug $G^7$, located a distance above the lug $G^2$ and adapted to swing into the path of the second lowermost button-blank at the time the arm $G^3$ swings outward, so that the lug $G^7$ supports the lowermost button-blank, and consequently the column of button-blanks in the chute. (See Fig. 6.) A spring $G^8$ presses the arm $G^6$ into an innermost active position; but the said arm $G^6$ is normally held in an outermost inactive position (see Fig. 7) by a link $G^9$, pivotally connected with a pin $G^{10}$ on the arm $G^6$ and having an elongated slot $G^{11}$, through which extends a pin $G^{12}$, held on the arm $G^3$. Now when the latter is in a closed position, as shown in Fig. 7, by the action of the spring $G^4$ then the link $G^9$ holds the arm $G^6$ in an outermost position against the tension of its spring $G^8$, which is somewhat weaker than the spring $G^4$. Now when the arm $G^3$ is caused to swing outward by the action of the pin $G^5$ on the slide $F'$ then the pin $G^{12}$, when reaching the outer end of the slot $G^{11}$, forces a sidewise movement of the link $G^9$ to swing the arm $G^6$ inward, so that the lug $G^7$ engages the second lowermost button-blank at the time the lug $G^2$ releases the lowermost button-blank. When the slide $F'$ moves inward, then the pin $G^5$ gradually releases the arm $G^3$, so that the spring $G^4$ thereof moves the arm in a closed position and the lug $G^2$ into the path of the button-blanks, and at the same time the arm $G^6$ is swung outward for the lug $G^7$ to release the now lowermost button-blank, so that the button-blanks slide downward in the chute G until the lowermost button-blank rests on the lug $G^2$. In order to properly guide the lowermost button-blank from the delivery end of the chute G into the recess $F^4$, I provide the head $F^3$ with guard-pins $F^{11}$, projecting upward from the top of the head $F^3$.

The tool-post I is inclined upwardly and forwardly and is provided at its upper end with a horizontally-disposed guideway, in which is adjustably secured the jaw-carrier I' by means of a bolt I², extending through an elongated slot I³ in the jaw-carrier I' and screwing in the post I. The shank of the tool H is clamped between jaws I⁴ and I⁵, of which the jaw I⁴ is integral with the jaw-carrier I' and the other jaw I⁵ is removably secured to the fixed jaw by a bolt I⁶. Now by the arrangement described the tool H can be readily secured between the jaws and the carrier I' can be adjusted longitudinally on the post I to bring the upper or cutting edge of the tool H in proper relation to the face of the button-blank E seated in the seat D².

In order to properly grind the upper edge of the turning-tool H by the grinding-wheel L, it is necessary to move the tool-post I and tool H upward in contact with the under face of the gringing-wheel L previous to moving the turning-tool H in engagement with the face of the button-blank E, and for the purpose mentioned I provide the following device: On the rear face of the tool-post I is secured or formed a nut I⁷, in which screws a screw-rod T, mounted to turn in suitable bearings in the carrier J, and on the lower end of the screw-rod T is secured a worm-wheel T', in mesh with a worm T², fastened on the worm-shaft T³, extending transversely and journaled in suitable bearings depending from the under side of the intermittently-reciprocating carriage K. On the rear end of the worm-shaft T³ is secured a ratchet feed-wheel T⁴, adapted to be engaged on the return stroke of the carriage K (see Fig. 3) by a spring-pressed pawl T⁵, provided on a bracket A³, secured to the rear side of the frame A. A stop-screw T⁶ on the bracket A³ engages the heel end of the pawl T⁵ to hold the latter in proper position for the pawl to engage and turn the feed-wheel T⁴ on the return stroke of the carriage K. Now when the feed-wheel T⁴ is turned the worm T² turns the worm-wheel T' and screw-rod T, and as the latter turns in the carrier J and screws in the nut I⁷ it is evident that the latter and the tool-post I and tool H are moved upward to bring the cutting edge of the tool in contact with the under side of the grinding-wheel L for the latter to grind the tool. It is understood that by the gearing described but a very minute upward feeding of the tool H takes place at every return stroke of the carriage. The grinding-wheel L is only rotated during the last portion of the return stroke and the beginning portion of the forward stroke of the carriage to properly grind the tool, and for the purpose mentioned the vertically-disposed shaft L' of the grinding-wheel L is journaled in suitable bearings held on a longitudinally-extending arm U, fulcrumed at U' on the rear of the frame A, (see Fig. 3,) and the forward end of the said arm U is held at the bottom and top between set-screws U² U³, screwing on the main frame A and serving to adjust the arm U up or down to bring the under surface of the wheel L in proper relation to the cutting-tool H and to compensate for the wear of the grinding-wheel. A bolt U⁴ serves to securely hold the arm in position on the frame A after the arm is properly adjusted for the purpose mentioned.

On the shaft L' of the grinding-wheel L is secured a bevel gear-wheel L², in mesh with a bevel gear-wheel L³, secured on the horizontally-disposed shaft L⁴, journaled in suitable bearings carried on the arm U, and on the said shaft L⁴ is mounted to rotate loosely a gear-wheel L⁵, in mesh with a gear-wheel L⁶, secured on the spindle C. The gear-wheel L⁵ is provided on one face with a clutch member L⁷, adapted to be engaged by a clutch member L⁸, mounted to slide on and to turn with the shaft L⁴, so that when the clutch member L⁸ is in mesh with the clutch member L⁷ and the spindle C is rotated then the gear-wheel L⁶ imparts a rotary motion to the gear-wheel L⁵, shaft L⁴, and bevel gear-wheel L³, so that the latter rotates the bevel gear-wheel L², shaft L', and grinding-wheel L. When the clutch member L⁸ is out of engagement with the clutch member L⁷, then the gear-wheel L⁵ rotates loosely on the shaft L⁴ and the latter and the grinding-wheel L remain at a standstill. The clutch member L⁸ is moved in and out of mesh with the clutch member L⁷ by a shifting-lever L⁹, engaging the clutch member L⁸ and fulcrumed on the main frame A at the rear side thereof, (see Fig. 3,) and the said shifting-lever L⁹ is preferably made in the shape of a bell-crank lever, carrying a friction-roller L¹⁰, adapted to be engaged by a cam K', held on the carriage K, so that when the carriage moves forward the said cam K' engages the friction-roller L¹⁰ at about the time the tool H moves out of engagement with the under side of the grinding-wheel L. When the friction-roller L¹⁰ travels up the cam K', a swinging motion is given to the shifting-lever L⁹ to move the clutch member L⁸ out of mesh with the clutch member L⁷, so that the rotary motion of the shaft L⁴ and the grinding-wheel L ceases, and when the carriage K is on the return stroke then the friction-roller L¹⁰ travels down the cam K' at the time the turning-tool H reaches the grinding-wheel L. A spring L¹¹ on the shifting-lever L⁹ now returns the latter to its former position to throw the clutch member L⁸ back into mesh with the clutch member L⁷, so that the shaft L⁴ and grinding-wheel L are again rotated to grind the tool H during the final rearward movement of the carriage K and during the first portion of the next following inward stroke of the said carriage.

In order to impart the desired intermittent reciprocating motion to the carriage K, I provide the under side thereof with a friction-roller K², in engagement with a peripheral cam-groove K³ on the multiple cam P, so that during three-fourths of a revolution of the multiple cam P the carriage K is moved but the feeding distance for the tool to turn the blank, and during the other one-fourth of the revolution the carriage K is moved the length of the inward or outward stroke—that is, two revolutions of the shaft N are required to complete the full stroke of the carriage.

In order to drive the cam-shaft N from the spindle C at a reduced rate of speed, I provide the following device: On the spindle C is secured a sprocket-wheel V, over which passes a sprocket-chain V', also passing over a sprocket-wheel $V^2$, mounted to rotate on a stud $V^3$, secured to a bracket $A^4$, carried by the main frame A, and on the said sprocket-wheel $V^2$ is secured a pinion $V^4$, in mesh with a gear-wheel $V^5$, journaled on a stud $V^6$, likewise secured to the bracket $A^4$, and on the said gear-wheel $V^5$ is secured a pinion $V^7$, in mesh with a gear-wheel $V^8$, secured on the cam-shaft N. The gearing described is so proportioned that it requires forty-four revolutions of the spindle C to make one revolution of the cam-shaft N.

The carrier J is transversely adjusted on the carriage K to bring the tool H in proper sidewise position relative to the face of the button-blank E, (see Fig. 1,) and for this purpose the carrier J is provided at its face with a fixed nut J', into which screws a screw-rod $J^2$, mounted to turn in a lug $J^3$, secured to the carriage K. On turning the screw-rod $J^2$ in the lug $J^3$ the carrier is moved transversely in the carriage K either to the rear or to the front, according to the direction in which the screw-rod $J^2$ is turned.

The operation is as follows: When the machine is running and the several parts are in the position as shown in Fig. 1, then the tool H is turning the face of the button-blank E held in the chuck D, and as soon as this blank is turned the carriage K moves outward and then the slide F' moves transversely to bring the button-blank E from the chute G in alinement with the chuck D, from which the turned button had previously been ejected by the ejector-rod Q on the receding of the carriage K. The pusher $F^2$ is now actuated to push the button-blank from the head $F^3$ into the seat $D^2$ of the open chuck D, and then the lever O' releases the chuck to allow the spring $D^6$ to move the chuck inward in the spindle to close the jaws and to securely clamp the blank in position in the seat $D^2$. When this has been done, the pusher $F^2$ slightly recedes to free the chuck and then the slide F' moves outward back into a receiving position from the chute G, and the carriage K advances to again bring the tool H in contact with the face of the blank to turn the latter. The above-described operation is repeated—that is, the blank after being turned by the tool H is ejected from the chuck and a new blank is brought to the chuck and pushed in position therein, after which this blank is turned by the tool H. The cam P is so arranged that the chuck makes about twenty-four revolutions during the time the tool H is turning the button-blank, and during this time the tool is fed slowly forward to turn the button-blank without chipping the same, it being understood that the portion of the cam-groove $K^3$ for feeding the carriage while the tool is turning the button-blank is extremely gradual while the portion of the groove for the backward-and-forward stroke of the carriage is very pronounced.

Having thus described my invention, I claim as new and desire to secure by Letters Patent—

1. A button-turning machine comprising a button-blank container for containing button-blanks, a chuck, a transferring device for transferring a button-blank from the container to the chuck and comprising a slide having transverse movement and formed with a recess, means for preventing the button-blank from falling out of the recess, and a pusher for pushing the button-blank out of the recess, a tool-carrier for carrying a turning-tool, arranged to advance to and recede from the chuck, for the tool to turn the face of the button-blank while in the chuck, an ejecting device for ejecting the turned button from the chuck, and means for imparting motion in proper sequence to the said transferring device, the said chuck, the said tool-carrier and the said ejecting device, as set forth.

2. A button-turning machine comprising a button-blank container for containing button-blanks, a chuck, a transferring device for transferring a button-blank from the container to the chuck and comprising a slide having a head formed with a recess, a spring device for preventing the button-blank from falling out of the recess, and a pusher for pushing the button-blank out of the recess past the spring device, a tool-carrier for carrying a turning-tool, arranged to advance to and recede from the chuck, for the tool to turn the face of the button-blank while in the chuck, a grinding device for grinding the tool during part of the receding and advance stroke, and means for imparting positive motion in proper sequence to the said transferring device, the said chuck, the tool-carrier and the grinding device, as set forth.

3. A button-turning machine comprising a driven part, a chuck driven from the said part, means controlled from the said part for opening the chuck, to eject a turned button, a button-container, a slide having transverse movement and controlled from the said driven part, to receive a blank from the container and move it in front of the open chuck, a pusher on the slide controlled from the said part, to push the button-blank out of the slide into the chuck, and a tool-carrier having longitudinal movement and controlled from the said part, to advance to and recede from the said chuck, as set forth.

4. A button-turning machine provided with a revoluble spindle, a chuck having its head formed with a seat for a button-blank, the chuck-shank having an extension projecting beyond the outer end of the spindle, a spring for moving the chuck inward in the spindle, means for moving the chuck outward against the tension of the spring, an ejector-rod in the chuck having a socket at its rear end, a spring in the said socket, and a rod held in the extension of the chuck and having a reduced end engaging the spring in the socket of the ejector-rod, as set forth.

5. A button-turning machine provided with a revoluble spindle having a beveled mouth, a chuck having its head and part of its shank split longitudinally to form jaws, the head having a seat for a button-blank and an annular bevel for engaging the mouth of the spindle, the chuck-shank having an extension projecting beyond the outer end of the spindle, a spring on said extension for moving the chuck inward in the spindle, means for moving the chuck outward against the tension of the spring, an ejector-rod in the said chuck having a socket at its rear end, a spring in the said socket, a rod held in the extension of the chuck and having a reduced end engaging the spring in the socket of the ejector-rod, and means for limiting the sliding movement of the socket of the ejector on said reduced end of the rod, as set forth.

6. A button-turning machine provided with a transferring device for transferring a button-blank from a container to a chuck, the said transferring device comprising a slide having a head formed with a recess, spring-arms for holding the button-blank in the recess, and a pusher for pushing the button-blank out of the recess past the spring-arms, as set forth.

7. A button-turning machine provided with a transferring device comprising a slide mounted to slide transversely and having a head formed with a recess for receiving a button-blank from a delivery-chute, and for transferring the button-blank to a chuck, spring-arms on the said head to hold the button-blank against falling out of the recess, an arm mounted to swing on the said slide, means for imparting movement to the said arm, and a pusher yieldingly mounted in the said arm and adapted to pass into the said recess of the slide-head, to push the button-blank out of the recess past the spring-arms, as set forth.

8. A button-turning machine provided with a transferring device having a slide formed with a head for containing a button-blank, spring-arms for holding the button-blank in position in the head, a pusher adapted to pass through an opening in the head, to engage the button-blank and push the same out of the head past the spring-arms, an arm mounted to swing on the said slide, and a spring pressing the said pusher in the said arm, as set forth.

9. A button-turning machine provided with a slide having a head formed with a recess for the reception of a button-blank, the said head having an aperture in its back wall leading into the said recess, and spring-arms extending radially in front of the recess, to engage the button-blank at the front face thereof, as set forth.

10. A button-turning machine provided with a button-blank delivery-chute for delivering the button-blanks singly to the head of a slide, spring-pressed arms on the said chute, having lugs extending into the path of the button-blanks one above the other, the spring of one of the arms being stronger than that of the other arm, and one of the arms being adapted to be engaged by the slide, to move the arm into an open position, and a link pivotally connected with one arm and having a sliding connection with the other arm, as set forth.

11. A button-turning machine provided with a reciprocating carriage, a carrier provided with a fixed nut, a screw-rod screwing in said nut and mounted to turn in a lug on the carriage, whereby the carrier is adjustable transversely on the carriage, a tool-post for carrying a tool and mounted to slide up and down in an inclined direction on said carrier, and a revoluble grinding-wheel adapted to be engaged by the tool during part of the movement of the carriage, as set forth.

12. A button-turning machine provided with a chuck, a carriage mounted to reciprocate toward and from the chuck, a carrier provided with a fixed nut, a screw-rod screwing in said nut and mounted to turn in a lug on the carriage, whereby the carrier is adjustable transversely on the carriage, a tool-post on the said carrier and carrying a turning-tool to turn the button-blank in the said chuck, the said tool-post being mounted to slide up and down in an inclined direction on the said carrier, a grinding-wheel adapted to be engaged by the said turning-tool during part of the stroke of the carriage, and means for feeding the said tool-post intermittently upward, as set forth.

13. A button-turning machine provided with a chuck, a carriage mounted to reciprocate toward and from the chuck, a carrier provided with a fixed nut, a screw-rod screwing in said nut and mounted to turn in a lug on the carriage, whereby the carrier is adjustable transversely on the carriage, a tool-post on the said carrier and carrying a turning-tool to turn the button-blank in the said chuck, a grinding-wheel adapted to be engaged by the said turning-tool during part of the stroke of the carriage, means for feeding the said tool-post intermittently upward, means for adjusting the grinding-wheel relative to the tool, and means for rotating the gringing-wheel and controlled from the carriage, as set forth.

14. A button-turning machine provided with an intermittently-reciprocating carriage, a carrier transversely adjustable on the said carriage, a tool-post upwardly adjustable in the said carrier and carrying a tool, a screw-rod engaging a nut on the rear face of said tool-post and mounted to turn in the said carrier, and an intermittent feed mechanism for the said screw-rod to turn the latter intermittently on the reciprocation of the carriage, the said feed mechanism comprising a worm-wheel on the lower end of the screw-rod, a worm in mesh with the said worm-wheel and having its shaft journaled on the carriage to move with the latter, a ratchet feed-wheel on the said worm-shaft, and a fixed bracket carrying a pawl adapted to engage the said ratchet feed-wheel on the return stroke of the carriage, as set forth.

15. A button-turning machine provided with an intermittently-reciprocating carriage, a carrier transversely adjustable on the said carriage, a tool-post upwardly adjustable in the said carrier and carrying a tool, a screw-rod engaging a nut on the said tool-post and mounted to turn in the said carrier, and an intermittent feed mechanism for the said screw-rod to turn the latter intermittently on the reciprocation of the carriage, the said feed mechanism comprising a worm-wheel on the screw-rod, a worm in mesh with the said worm-wheel and having its shaft journaled on the carriage to move with the latter, a ratchet feed-wheel on the said worm-shaft, a bracket secured to the frame of the machine, a spring-pawl on said bracket and adapted to engage the said ratchet feed-wheel on the return stroke of the carriage and a stop-screw on the bracket engaging the heel end of the pawl for holding the said pawl in proper position relative to the ratchet feed-wheel, as set forth.

16. A button-turning machine provided with a revoluble spindle, a chuck carried thereby, a reciprocating carriage for a turning-tool, a grinding-wheel for grinding the said tool, means for rotating the grinding-wheel from the said spindle, a clutch mechanism, and means carried by the carriage for controlling said clutch mechanism to throw the driving-gear for the grinding-wheel in and out of mesh, to intermittently rotate the said grinding-wheel, as set forth.

17. A button-turning machine comprising a spindle, a chuck on the said spindle, a reciprocating tool-carriage carrying a tool for turning the button-blank held in the said chuck, means for imparting an intermittent reciprocating motion to the said carriage, a grinding-wheel adapted to grind the said tool, means for turning the grinding-wheel from the said spindle, and means controlled by the said carriage for throwing the gearing for the grinding-wheel in and out of mesh, to intermittently rotate the grinding-wheel from the spindle, as set forth.

18. A button-turning machine having an intermittently-reciprocating tool-carriage carrying a tool, a grinding-wheel mounted to rotate, and a clutch mechanism controlled from the said carriage and arranged to throw the driving-gear for the grinding-wheel in and out of mesh, to intermittently rotate the said grinding-wheel, as set forth.

19. A button-turning machine provided with a grinding-wheel having a vertically-disposed shaft, an arm in which the grinding-wheel is journaled, a horizontally-disposed shaft geared with the shaft of the grinding-wheel, a tool-carrying carriage, means for adjusting the said arm to bring the grinding-wheel in proper position for the tool to be ground, a chuck-carrying spindle, a gearing between the spindle and the horizontally-disposed shaft, and a clutch mechanism controlled from the carriage for throwing said gearing in and out of mesh, as set forth.

20. A button-turning machine, comprising a button-blank delivery-chute, a slide to which the blanks are delivered, spring-pressed arms extending into the path of the button-blanks to support the same in the delivery-chute, and a connection between the said arms, the arms being controlled by the said slide, as set forth.

21. A button-turning machine, comprising a button-blank delivery-chute, a slide to which the buttons are delivered, spring-pressed arms controlled by the slide for delivering the button-blanks singly to the slide, a chuck into which the blank is adapted to be pushed from the slide, and means for pushing the button-blank from the slide, as set forth.

22. A button-turning machine, comprising a button-blank delivery-chute, a slide to which the blanks are delivered, means for delivering the blanks singly to the slide and controlled therefrom, a chuck, an arm mounted to swing on the slide, a pusher for pushing the button-blank from the slide into the chuck, the said pusher being mounted to slide in a recess in the arm, a tool-carrier for carrying a turning-tool, to turn the face of the button-blank while in the chuck, and an ejecting device for ejecting the turned button from the chuck, as set forth.

23. A button-turning machine, comprising a button-blank delivery-chute, a slide to which the blanks are delivered, means controlled by the slide for delivering the button-blanks singly to the slide, a chuck, means for pushing the blank from the slide into the chuck and comprising an arm mounted to swing on the slide and a pusher yieldingly mounted in the arm, a tool-carrier for carrying a turning-tool, arranged to advance to and recede from the chuck for the tool to turn the face of the button-blank while in the chuck, and a grinding device for grinding the tool during part of the receding and advance stroke of the tool-carrier, as set forth.

24. A button-turning machine, comprising a button-blank container, a chuck, a transferring device for transferring a button-blank from the container to the chuck, the said transferring device comprising a slide having a head formed with a recess for the blank, an arm mounted to swing on the slide, a pusher mounted in the arm and adapted when the arm is swung inward or toward the slide, to pass into the recess in the slide to push the button-blank therefrom into the chuck, means for swinging the arm inward, and means for imparting a positive outward swinging motion to the arm after the blank has been delivered to the chuck, as set forth.

25. A button-turning machine, comprising a button-blank container, a spindle, a chuck on the spindle, a transferring device for transferring a button-blank from the container to the chuck, a tool-carriage for carrying a turning-tool arranged to advance to and recede from the chuck, an ejecting device for ejecting the turned button, a grinding-wheel for grinding the tool during part of the stroke of the tool-carriage, means for turning the grinding-wheel from the spindle, means controlled by the tool-carriage for throwing the grinding-wheel into and out of action, a cam-shaft driven from the spindle and provided with a cam, means for actuating the transferring device from the said cam, and means for imparting a reciprocating movement to the carriage from the said cam, as set forth.

In testimony whereof I have signed my name to this specification in the presence of two subscribing witnesses.

HENRY A. BERGER.

Witnesses:
RICHARD A. BERGER,
GEORGE ERICH.